United States Patent [19]

Rabinow

[11] 4,199,241

[45] Apr. 22, 1980

[54] SOUND OR VIBRATION OPERATED FLASH SYNCHRONIZER FOR CAMERA

[75] Inventor: Jacob Rabinow, Bethesda, Md.

[73] Assignee: Hall & Myers, Potomac, Md.

[21] Appl. No.: 945,263

[22] Filed: Sep. 25, 1978

Related U.S. Application Data

[63] Continuation of Ser. No. 838,171, Sep. 29, 1977, abandoned.

[51] Int. Cl.² .............................................. G03B 15/03
[52] U.S. Cl. .................................................... 354/129
[58] Field of Search ...................... 354/75, 76, 81, 129, 354/131, 135, 140, 141, 147, 266, 137; 340/221, 261; 273/105.1

[56] References Cited

U.S. PATENT DOCUMENTS

| | | | |
|---|---|---|---|
| 2,679,187 | 5/1954 | Bitting, Jr. | 352/17 |
| 3,528,354 | 9/1970 | Nakagawa et al. | 354/131 |
| 3,709,118 | 1/1973 | Shoupp et al. | 354/135 |
| 3,726,195 | 4/1973 | Wagner et al. | 354/131 |

Primary Examiner—Michael L. Gellner
Attorney, Agent, or Firm—William D. Hall

[57] ABSTRACT

A device for synchronizing the flash of a camera with the operation of the shutter in which there are means responsive to the vibrations created by the movement, or abrupt stoppage, of the shutter. The vibrations resulting from shutter operation, according to the invention, may be the sound created by shutter operation or the vibration of the frame created by shutter operation, or a combination of sound and frame vibrations. After the vibrations have been detected, they may operate electrical apparatus which in turn operates the flash device. The electrical apparatus may include a time delay, if necessary, and it may include suitable switching so that battery power is used only when pictures are being taken.

18 Claims, 3 Drawing Figures

SOUND OR VIBRATION OPERATED FLASH SYNCHRONIZER FOR CAMERA

This application is a continuation of my prior copending application, Ser. No. 838,171, filed Sept. 29, 1977, entitled "Sound or Vibration Operated Flash Synchronizer for Camera," now abandoned.

BACKGROUND OF THE INVENTION

There are in existence now hundreds of thousands of cameras and lens shutters which have no provision for flash synchronization. In modern cameras, flash contacts are, of course, provided. In the older cameras and shutters, no provision was made and various expedients have been employed in order to synchronize the flash. My invention consists of using the sound or the vibration of the shutter or of other camera mechanisms to fire the flash.

Many camera shutters and many cameras are not provided with flash synchronization means. Hundreds of thousands of such cameras are still in existence and, particularly, many of them are used by professionals in the photographic business because of the excellence of the shutters and lenses involved.

In the past, there have been means to synchronize flash units with such shutters by using solenoids which were operated by the flash unit. In other words, the flash unit drove the shutter at the appropriate moment after the start of its flash. Such methods using solenoid synchronization do not work well, particularly with electronic flash units popular at the present time.

Many devices for controlling flash attachments for cameras are operated directly or indirectly by the push button or other mechanism which releases the shutter rather than by the vibrations created by shutter operation itself. Some of these devices have impact means, triggered by the shutter release button which strikes a piezo-electric element to cause it to generate an impulse voltage for operating the flash. See U.S. Pat. Nos. 3,528,354 and 3,726,195. All of these devices have a disadvantage in that they do not adequately synchronize the flash with the operation of the shutter. Moreover, it is difficult to apply the prior art devices to existing cameras.

SUMMARY OF THE INVENTION

A sound or other vibration responsive device is mounted adjacent the shutter, preferably upon the frame of the camera, so that when the shutter opens, the resulting vibrations produce a signal at the output of the vibration responsive device which may be amplified and/or delayed and arranged to operate a small relay which in turn will operate the flash attachment.

Suitable means may be employed so that the electrical apparatus is energized by the battery only during periods when the camera is being used.

DETAILED DESCRIPTION OF THE INVENTION

Figure 1:
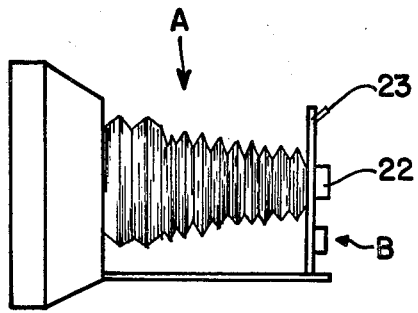
FIG. 1 is a side view of a conventional camera with my flash control attachment B added to the camera.
Figure 2:
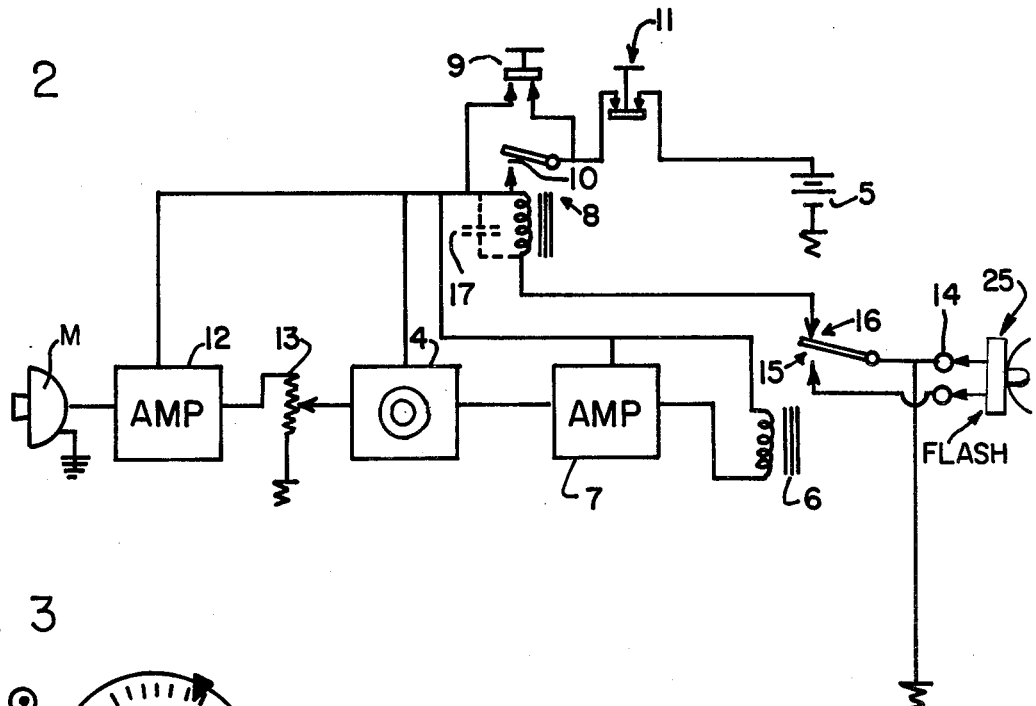
FIG. 2 is a schematic diagram of the flash control device B of FIG. 1.
Figure 3:
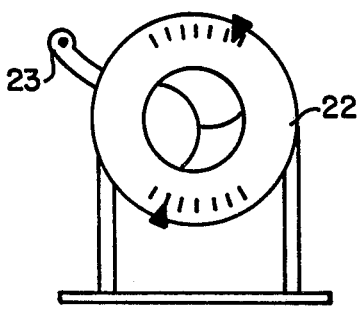
FIG. 3 is a conventional shutter, and shutter release mechanism, used in the camera of FIG. 1.

In FIG. 1 a conventional camera A has a shutter 22 (FIG. 3) operated by a shutter release mechanism 23 in the usual manner. An attachment B may be applied to an existing camera A, such as the camera hereinabove described. The attachment B is adapted by means of a clip or other suitable attaching means to be in fixed position on the frame of the camera adjacent the shutter, so that whenever the shutter operates the vibrations created by such operation are detected by the attachment B to operate the flash. The apparatus in the attachment B is shown in schematic form in FIG. 2.

The vibration detector (microphone) M is connected to the input of the high-gain amplifier 12. The output of this amplifier 12 is fed to a gain control 13 which, in turn, is connected to the one-shot and time-delay circuit 4. There are many commercial devices available that can perform the functions of component 4. One such is manufactured by Signetics and is described on pages 6-49 to 6-52 in their catelog entitled "Signetic Catalog on Digital Linear and MOS Circuits." The device is called a "Linear Integrated Circuit No. 555." When connected as shown on page 6-52 under the heading "Monostable Operation," it can be triggered by a suitable signal and will produce a single output pulse which can be adjusted to last from microseconds to hours.

The output of this one-shot 4 may operate a sensitive relay 6 directly, but I prefer to feed this output into a second amplifier 7. This amplifier 7 can be adjusted to operate on the trailing edge of the output pulse of the "One-Shot" 4 and output a current pulse to operate the flash relay 6. I prefer to use a small relay 6 with a pair of contacts because the operation of the flash unit then will be conventional. Also, one can use a small reed relay, which consists of a coil of wire in the center of which is a small glass-sealed pair of contacts. Again, these devies are well known to the art and need not be described here in detail.

In order to eliminate the possibility of spurious flashes and to conserve battery current, I provide the relay 8. This relay 8 is originally turned on by a manual, normally open, push button 9, actuated by the operator of the camera equipment. When the button 9 is temporarily depressed, current is applied to the holding or locking relay 8 and to the rest of the equipment of FIG. 2. The relay 8 closes its own contacts 10 and thus remains energized even though the switch 9 is open. I also provide another push-button switch 11 which serves to open the battery 5 circuit if the operator decides to disable the flash device after having set the device to operate by the actuating button 9. This button switch 11, like switch 9, is of the momentary type, except that its contacts are normally closed, while the contacts of switch 9 are normally open.

When the camera A shutter 22 is tripped, the blades of a between-the-lens shutter are opened or the first element of a focal plane shutter reaches its end of travel, and there is a considerable mechanical shock produced in such mechanism. This is picked up by the microphone device II, amplified, delayed if necessary, and finally operates the flash relay 6. If a fast electronic flash is used, the time delay 4 may not be necessary at all because as soon as the shock is detected the shutter is open and the flash is to go off.

If there is a need for a delay because the signal that is picked up is not caused by the shutter opening but by some other part of the camera mechanism such as reflex mirror, then a time delay 4 has to be introduced so that the flash will occur at the right moment. The contacts for operating the flash 25 are shown at 14 and are operated by the contacts 15 of the relay 6. This relay 6 also serves the second function of opening the battery circuit by de-energizing the relay 8 by the opening of contacts 16. Thus, no subsequent camera signal can operate this device until relay 8 is re-set by the action of the manual switch 9. The relay 8 must not open before contacts 15 close. Normally this is no problem since the amplifier 7 has sufficient storage of energy to pull down relay 6. In any case, the relay 8 can be chosen to have a bigger air gap to be slower than relay 6, or a capacitor 17 can be added to delay the release of the electromagnet of the relay 8.

The method of synchronizing the flash can be quite straightforward. For example, when the camera without its film can be opened, the flash can be inspected by eye through the lens, the gain 3 can be set and the delay 4 operated to such a setting that when the camera shutter is tripped the flash is seen through the lens. There are more precise ways of doing this, of course, by using, for example, a double beam oscilloscope and observing a steady light passing through the lens with a separate photocell on one sweep, and on the other sweep observing the operation of the unit by a separate photocell. Thus, one can observe when the lens is fully opened and when the flash occurs. By adjusting the gain, with potentiometer 13, and the time delay 4, the lens opening and the flash can be brought into synchronization.

Instead of using a small microphone M as a vibration responsive device. I may employ a phonograph cartridge with the stylus completely enclosed so that the stylus acts as the vibration detector. In order to make it more sensitive, a small mass can be added to the stylus tip as, for example, a drop of cement so that the cartridge becomes in effect a very sensitive microphone. As is well known, a weak shock applied to a phonograph stylus produces a considerable electrical output. There are many other commercially available vibration pickups that can be used which employ either electret elements, magnetic transducers, capacitive pickups, and so on. The art is too well known to be described in here in detail.

I claim to have invented:

1. A flash control device for a camera having a shutter comprising:
   flash producing means, and
   vibration responsive means responsive to the vibration resulting from a single normal opening of said shutter of said camera for operating said flash producing means to produce a flash.

2. A flash control device according to claim 1 in which said vibration responsive means is responsive to mecchanical vibrations of the camera.

3. A flash control device according to claim 1 in which said vibration responsive means comprises sound responsive means.

4. A flash control device according to claim 1 in which said vibration responsive means is a microphone.

5. A flash control device for a camera having a shutter comprising:
   flash producing means, and
   means responsive to the vibration produced by the motion of said shutter during a single normal opening of said shutter of said camera, for operating said flash producing means to produce a flash in response to said single normal opening.

6. A flash control, for operating flash producing means, adapted to be associated with a camera having a shutter, comprising:
   an output device for operating said flash producing means,
   vibration responsive means responsive to vibrations resulting from a single opening of said shutter, and
   control means to control said output device to condition it to operate a flash producing means connected thereto.

7. A flash control device according to claim 6 in which said control means includes an amplifier to amplify the output of said vibration responsive means.

8. A flash control device according to claim 6 in which said control means includes time delay means for delaying the output of the vibration responsive means.

9. A flash control device according to claim 6 including threshold means between said vibration responsive means and said control means so that device does not operate a flash producing means unless the amplitude of the vibrations detected by the vibration responsive means exceeds a pre-set threshold.

10. A flash control device according to claim 9 in which said control means includes adjustable means for setting said threshold to a desired valve.

11. A flash control device as defined in claim 6 in which said output device comprises a terminal to which a flash producing device may be connected, said vibration responsive means comprising a microphone, and said control means including electrical circuitry responsive to the output of said microphone.

12. A flash control device according to claim 11 including a battery, a normally-off switch in series with said battery for conditioning said device for operation, locking relay means for shunting said switch once it is closed, a second switch for deenergizing said locking relay means, and means for feeding current from said battery to said electrical circuitry when either the normally-off switch is closed or the locking relay means is shunting said normally-off switch.

13. A flash control, for operating flash producing means, operable with a camera having film exposing means which moves to a film exposing position to expose a film comprising:
   a device for operating said flash producing means, and
   vibration responsive means responsive to vibrations resulting from a single movement to the film exposing position of said film exposing means, to control said device to operate the flash producing means.

14. A flash control device according to claim 13 in which said control means includes an amplifier to amplify the output of said vibration responsive means.

15. A flash control device according to claim 13 in which said control means includes time delay means for delaying the output of the vibration responsive means.

16. A flash control device according to claim 13 including threshold means between said vibration responsive means and said control means so that the said device does not operate a flash producing means unless the amplitude of the vibrations detected by the vibration responsive means exceed a present threshold.

17. A flash control device according to claim 13 in which said control means includes adjustable means for setting said threshold to a desired value.

18. A flash control device as defined in claim 13 in which said device comprises a terminal to which a flash producing device may be connected, said vibration responsive means comprising a microphone, and said control means including electrical circuitry responsive to the output of said microphone.

* * * * *

UNITED STATES PATENT AND TRADEMARK OFFICE
CERTIFICATE OF CORRECTION

PATENT NO.  : 4,199,241
DATED       : April 22, 1980
INVENTOR(S) : Jacob Rabinow It is certified that error appears in the above-identified patent and that said Letters Patent is hereby corrected as shown below:

On the Title page:

After "[73] Assignee: Hall & Myers, Potomac, Md."

insert:   --a part interest--.

Signed and Sealed this

Seventh Day of September, 1993

Attest:

BRUCE LEHMAN

Attesting Officer

Commissioner of Patents and Trademarks